(12) United States Patent
Hausmann et al.

(10) Patent No.: US 8,905,686 B2
(45) Date of Patent: Dec. 9, 2014

(54) TRIANGLE INSERT WITH MULTIPLE CUTTING EDGES AND MILLING CUTTER THEREFOR

(75) Inventors: Martin Hausmann, Ratingen (DE); Jürgen Zastrozynski, Düsseldorf (DE); Carsten Schwaner, Mülheim (DE)

(73) Assignee: Kennametal Inc., Latrobe, PA (US)

( * ) Notice: Subject to any disclaimer, the term of this patent is extended or adjusted under 35 U.S.C. 154(b) by 155 days.

(21) Appl. No.: 13/523,962

(22) Filed: Jun. 15, 2012

(65) Prior Publication Data

US 2013/0004251 A1 Jan. 3, 2013

(30) Foreign Application Priority Data

Jun. 29, 2011 (DE) .......................... 10 2011 105 978

(51) Int. Cl.
*B23C 5/22* (2006.01)
*B23C 5/06* (2006.01)
*B23C 5/20* (2006.01)
*B23B 27/16* (2006.01)

(52) U.S. Cl.
CPC . *B23C 5/06* (2013.01); *B23C 5/207* (2013.01); *B23C 2200/0477* (2013.01); *B23C 2200/208* (2013.01)
USPC .......................................... 407/113; 407/114

(58) Field of Classification Search
USPC .............................. 407/113, 114, 42, 115, 116
See application file for complete search history.

(56) References Cited

U.S. PATENT DOCUMENTS

| | | | | | |
|---|---|---|---|---|---|
| 4,297,058 A | * | 10/1981 | Armbrust et al. | ............. | 407/113 |
| 4,318,644 A | * | 3/1982 | Seidel | ............. | 407/114 |
| 4,681,487 A | * | 7/1987 | Pettersson | ............. | 407/114 |
| 4,755,086 A | * | 7/1988 | Stashko | ............. | 407/114 |
| 5,839,857 A | * | 11/1998 | Paya | ............. | 407/114 |
| 5,876,160 A | * | 3/1999 | Johnson | ............. | 409/132 |
| 5,964,552 A | * | 10/1999 | Larsen | ............. | 407/113 |
| 7,118,312 B2 | * | 10/2006 | Norstrom et al. | ............. | 407/113 |
| 7,488,143 B2 | * | 2/2009 | Muren et al. | ............. | 407/113 |
| 7,494,303 B2 | * | 2/2009 | Koskinen | ............. | 407/113 |
| 7,604,441 B2 | * | 10/2009 | Bhagath | ............. | 407/113 |
| 7,901,161 B2 | * | 3/2011 | Jansson | ............. | 407/113 |
| 8,475,090 B2 | * | 7/2013 | Mergenthaler et al. | ............. | 408/1 R |
| 8,511,943 B2 | * | 8/2013 | Gustavsson | ............. | 407/42 |
| 8,573,905 B2 | * | 11/2013 | Hecht | ............. | 407/113 |
| 8,641,331 B2 | * | 2/2014 | Zastrozynski et al. | ............. | 407/113 |
| 8,777,524 B2 | * | 7/2014 | Choi et al. | ............. | 407/42 |
| 2007/0071559 A1 | * | 3/2007 | Koskinen | ............. | 407/34 |
| 2008/0044241 A1 | * | 2/2008 | Koskinen | ............. | 407/103 |
| 2010/0266353 A1 | * | 10/2010 | Zitzlaff et al. | ............. | 407/113 |
| 2011/0305534 A1 | * | 12/2011 | Park et al. | ............. | 407/100 |
| 2013/0183110 A1 | * | 7/2013 | Schaefer et al. | ............. | 407/102 |

FOREIGN PATENT DOCUMENTS

GB 1171671 A † 11/1969

* cited by examiner
† cited by third party

*Primary Examiner* — Will Fridie, Jr.

(74) *Attorney, Agent, or Firm* — Larry R. Meenan, Esq

(57) ABSTRACT

An indexable insert has a triangular shape with a top surface and a bottom surface, as well as a circumferential surface that connects said the top and bottom surfaces, and cutting edges around the corners. At least in the region of its edges on the top and bottom surface, the indexable insert is identical such that all six cutting edges can be used for the same rotational cutting direction. The secondary cutting edges adjoin two main cutting edges and extend at different angles with respect to the same. In addition, a surface corner milling cutter with a corresponding indexable insert is described.

14 Claims, 3 Drawing Sheets

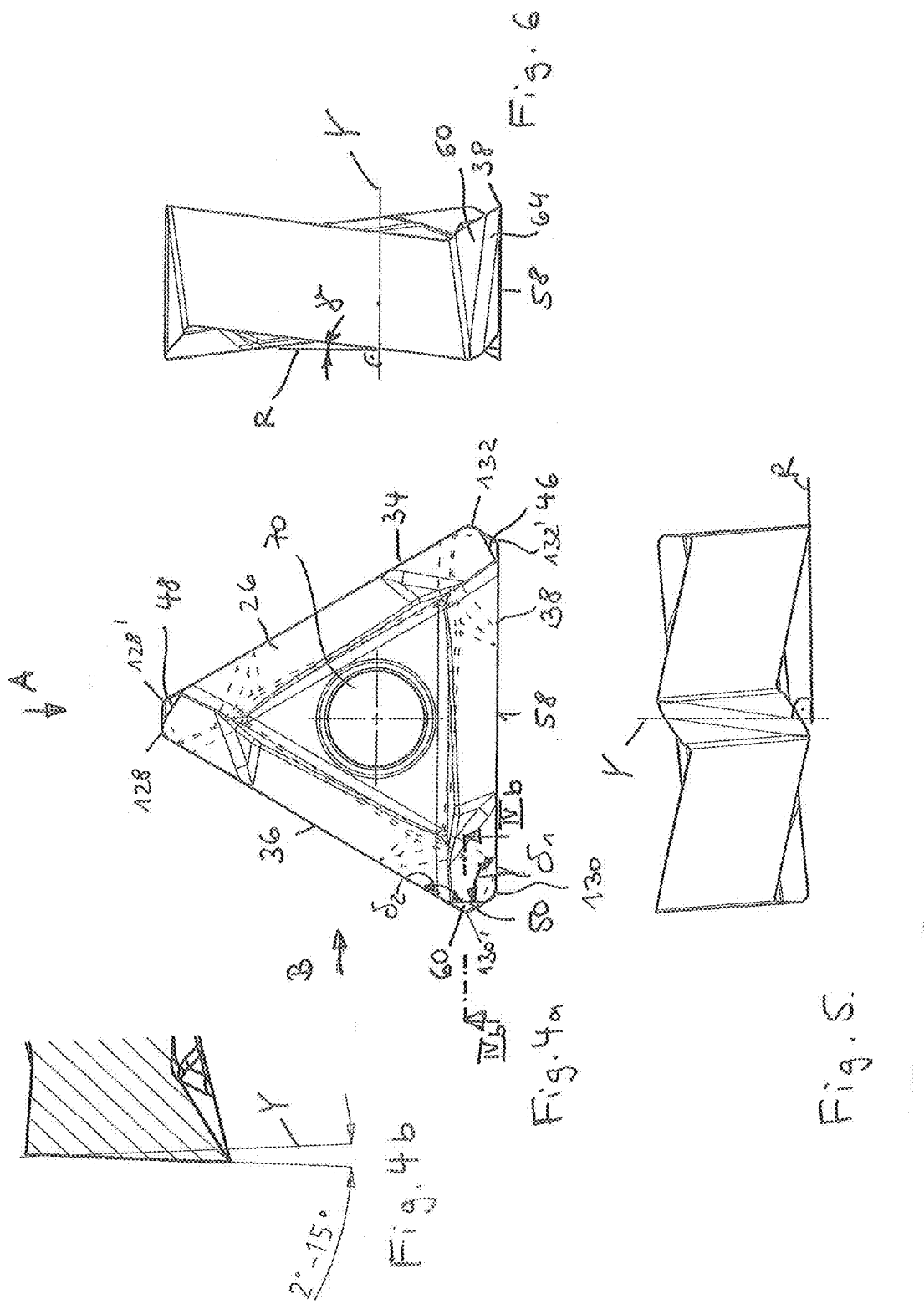

TRIANGLE INSERT WITH MULTIPLE CUTTING EDGES AND MILLING CUTTER THEREFOR

CLAIM TO PRIORITY

This application is a National entry application of German Application No. 102011105978.8, filed on Jun. 29, 2011, the entire contents of which is incorporated herein by reference.

FIELD OF THE INVENTION

The invention relates to an indexable insert, having a triangular shape having a top surface and a bottom surface as well as a circumferential surface which connects said surfaces, wherein cutting edges, which connect the circumferential surface to the top surface or the bottom surface, extend around the corners on each top surface and bottom surface.

Over and above this, the invention relates to a surface corner milling cutter with a tool shank and at least one indexable insert fastened thereon.

BACKGROUND OF THE INVENTION

Triangular indexable inserts are used for turning and milling. The indexable inserts, in this case, have a main cutting edge and an adjoining secondary cutting edge, said cutting edges merging into each other in the region of one corner of the triangle. Such an indexable insert is known from U.S. Pat. No. 3,800,379. On its top surface along the longitudinal edges of the triangle, said cutting tip, which is used for turning, has main cutting edges and adjacent, short secondary cutting edges. A support surface, which has no cutting function whatsoever, is provided between the secondary cutting edge and the main cutting edge of the adjacent corner which lies on the same longitudinal edge. The bottom surface of said indexable insert is planar.

U.S. Pat. No. 5,876,160 discloses a triangular indexable insert where the corners of the triangle are approximately at 135° to the main cutting edge on the longitudinal edge. The corners, moreover, are formed by two butt-jointed secondary cutting edges which in each case extend in a straight line. Each secondary cutting edge is associated with a directly adjoining main cutting edge such that each main cutting edge has a secondary cutting edge adjoining it on a respective longitudinal end. Consequently, the indexable insert can be used as a left-handed and right-handed tip, i.e. with a left-handed and also right-handed spindle axis. The maneuverability of the cutting tip is produced by it being a negative indexable insert, i.e. its wedge angle in sections is 90°. Even in the case of the aforementioned U.S. Pat. No. 3,800,379 it is a so-called negative cutting tip which, however, cannot be turned but just rotated.

SUMMARY OF THE INVENTION

It is the object of the invention to create a versatile indexable insert.

This object is achieved in the case of an indexable insert of the aforementioned type in that the geometry of the top surface and of the bottom surface is the same at least in the region of their edges. Through the identical geometry at least in the region of the edges, preferably over the entire top surface and bottom surface, the indexable insert as claimed in the invention can be used with all the cutting edges for the same rotational cutting direction. The secondary cutting edges in each case directly adjoin two main cutting edges, but are at different angles with respect to the two main cutting edges.

In the prior art either several secondary cutting edges were formed next to each other such that each secondary cutting edge adjoined only one main cutting edge, which is why the corner of the indexable insert was formed in a complicated manner, or the secondary cutting edges were at the same angle with respect to the two main cutting edges. In this case, however, the angles between the main cutting edge and the secondary cutting edge were restricted to 120°, as symmetrical geometry was only possible at this angle.

The invention, however, provides that the angles between the secondary cutting edge and the two main cutting edges are different such that even angles of <120° can be achieved between main and associated secondary cutting edge. In spite of this asymmetry, the insert as claimed in the invention can be turned and can be used on both sides for the same cutting direction. Consequently, in total there are six pairs of cutting edges (i.e. main and secondary cutting edge) which are identically realized and can be used for the same purpose on the indexable insert as claimed in the invention.

As claimed in the preferred embodiment, the indexable insert as claimed in the invention is realized as a corner milling cutting tip, in particular even as a 90° surface corner milling cutting tip. In the case of this embodiment, the main cutting edges are at approximately 90° with respect to their associated secondary cutting edges.

The secondary cutting edges are formed in that the corners of the triangle are not trimmed repeatedly but are trimmed once to form in each case only one single secondary cutting edge. In a preferred manner, the secondary cutting edges can extend in a linear manner. Trimmed means that the corners of the triangle extend as cut-off, wherein trimmed once means that just one single secondary cutting edge is present by means of the trimming.

As claimed in the preferred embodiment, each main cutting edge extends over the entire length of its associated longitudinal edge. As a result, a long length is achieved for the main cutting edges, which increases the depth of cut.

In particular, but not absolutely necessarily, the longitudinal edges and the main cutting edges extend in a linear manner, which makes them usable for face milling.

The main cutting edges are even preferably so long that they extend from the cutting edge corner, which is formed together with its associated secondary cutting edge, as far as up to the end of the adjoining secondary cutting edge which is no longer associated with the main cutting edge. Intermediate surfaces or intermediate edges, as was conceived in the prior art as the transition between the end of the main cutting edge and the adjoining secondary cutting edge, are omitted. The cutting edge corners are formed between the main cutting edge and its secondary cutting edge, against which, quite generally speaking, the term "corners" refers to the three corners or tips of the triangle, which are, however, trimmed.

In order to enable maneuverability with a positive indexable insert, the preferred embodiment provides that, in each case, specific triangular flanks which extend to the opposite insert surface proceed from the two opposite secondary cutting edges of a cutting edge corner. Said two flanks which directly adjoin each other are angled toward each other. The term "insert surface" is to define the top surface and the bottom surface. When seen in top view onto the indexable insert, the two secondary cutting edges are consequently arranged slightly offset with respect to each other in order to be able to achieve the maneuverability with the identical cutting direction. The flanks of the secondary cutting edges have their base on the associated secondary cutting edge and run in the direction toward the opposite secondary cutting edge on the other insert surface, wherein the flanks do not have to taper but can also essentially form a trapezoid form, which, in the present case, is also to be encompassed by the term "triangular".

The adjacent flanks of the secondary cutting edges are realized, in particular, as planar surfaces, which simplifies the producibility thereof. As an alternative, the flanks could also be slightly convex, as a result of which better surfaces are produced on the workpiece.

The transition between the adjacent flanks is a connecting edge which extends from the cutting edge corner between the main and secondary cutting edge on one insert surface to the cutting edge corner on the opposite insert surface. Said connecting edge should extend, in particular, in a linear manner. To increase the tool life and simplify producibility, the connecting edge can be rounded or chamfered. In the previously named prior art, connecting edges with negative secondary cutting edges were always sharp-edged.

As claimed in the preferred embodiment, proceeding from the secondary cutting edges, the flanks of the secondary cutting edges extend inclinedly sideways and outward toward the opposite insert surface. In particular, each flank extends at an angle of between 2 and 20° with respect to a center axis of the indexable insert. Said center axis is, in particular, defined by a central opening through which a fastening screw extends, but which is not absolutely necessary. When viewed in top view onto the top surface and bottom surface, it can be seen that, as claimed in this embodiment, the flank of the secondary cutting edges, which proceeds from the insert surface lying upward in each case, protrudes slightly inclinedly outward.

A further characteristic feature of the indexable insert as claimed in the invention consists in that its rake face has differently inclined regions along the main cutting edge; this is also referred to as a so-called divided main cutting edge. Said different inclined rake face regions are to take into account the different requirements for the various sections of the main cutting edge such that optimum adaptation is achieved.

The rake face of the main cutting edge can be inclined more strongly in the region of the secondary cutting edge than in the region remote from the associated secondary cutting edge.

The rake face at the transition between the main and secondary cutting edge is preferably inclined in two directions in order to optimize the chip flow both at the secondary cutting edge and also at the main cutting edge.

The differently inclined regions of the rake face can merge into each other by means of an inclined step, wherein said step is, in particular, a triangular end face which is inclined obliquely with respect to the adjoining rake faces.

A further characteristic feature of the invention consists in that the flank of each main cutting edge is planar and has no differently inclined sections.

Over and above this, the invention relates to a surface corner milling cutter, in particular a 90° surface corner milling cutter, having one tool shank and fastened thereon at least one indexable insert as claimed in the invention. The indexable insert is fastened to the tool shank such that the flank of the secondary cutting edge in use has a positive clearance angle.

BRIEF DESCRIPTION OF THE DRAWINGS

Further features and advantages of the invention are apparent in the following description and the following drawings, to which reference is made and in which:

FIG. 4a shows a top view onto the indexable insert according to FIG. 1, FIG. 4b shows a section through a corner of the indexable insert along the line IVb-IVb in FIG. 4a, FIG. 5 shows a side view of the indexable insert in the direction of the arrow A in FIG. 4 and FIG. 6 shows a side view of the indexable insert according to FIG. 4 when viewed in the direction of the arrow B.

DETAILED DESCRIPTION OF THE INVENTION

Figure 1:
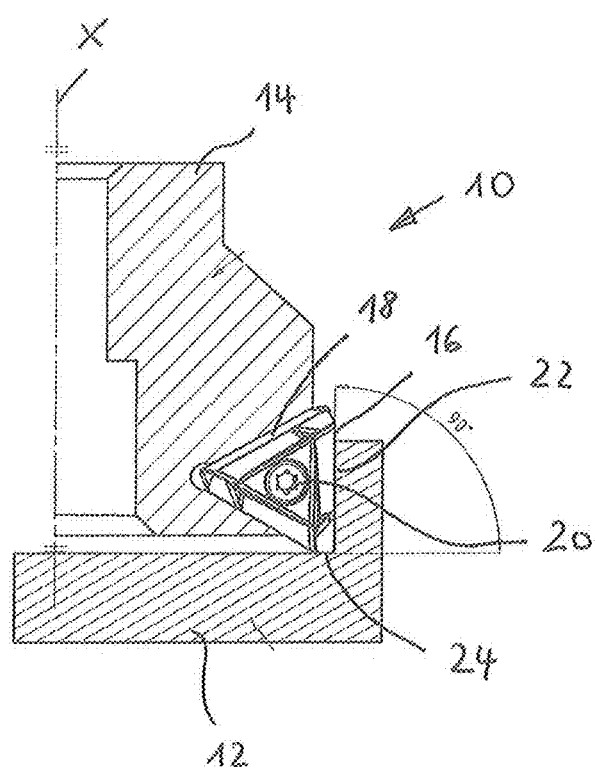
FIG. 1 shows a radial sectional view through a surface corner milling cutter as claimed in the invention with an indexable insert as claimed in the invention.

FIG. 1 shows a sectioned representation of a so-called surface corner milling cutter 10 in a radial section through its rotational axis X and through a workpiece 12. The milling cutter 10 comprises a driven tool shank 14, on the outer circumference of which several indexable inserts 16 are fastened. To this end, the shank 14 has corresponding pockets 18, in which the respective indexable inserts 16 are accommodated. The fastening of the indexable inserts 16 is effected, in particular, by means of screws 20 which pass through the center of the indexable inserts 16.

The indexable inserts 16 shown are triangular in shape and the cutting tips are in the form of a "T", i.e. it is an equilateral triangle.

As can be seen in FIG. 1, the surface corner milling cutter 10 is a 90° surface corner milling cutter, i.e. the main cutting edges 22 which lie on the outer circumference of the milling cutter extend at approximately 90° with respect to the end face, shorter secondary cutting edges 24.

Figure 2:
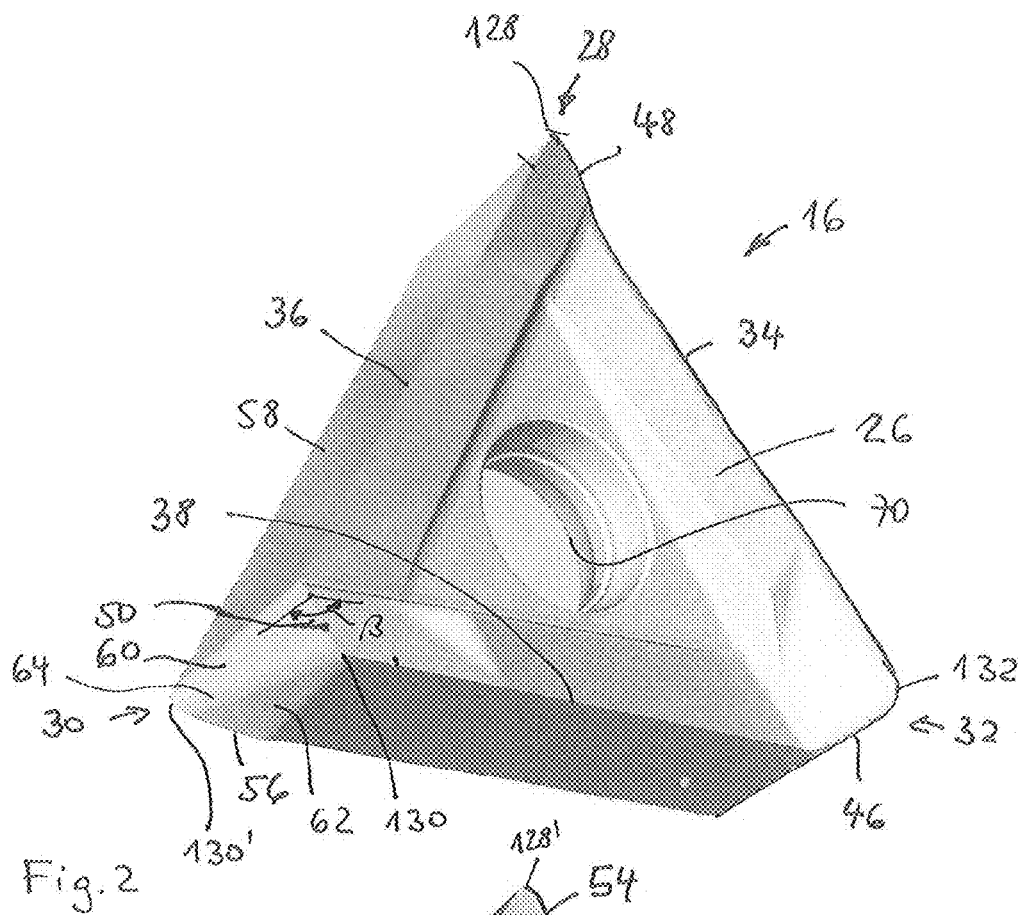
FIG. 2 shows a perspective top view onto the indexable insert as claimed in the invention.
Figure 3:
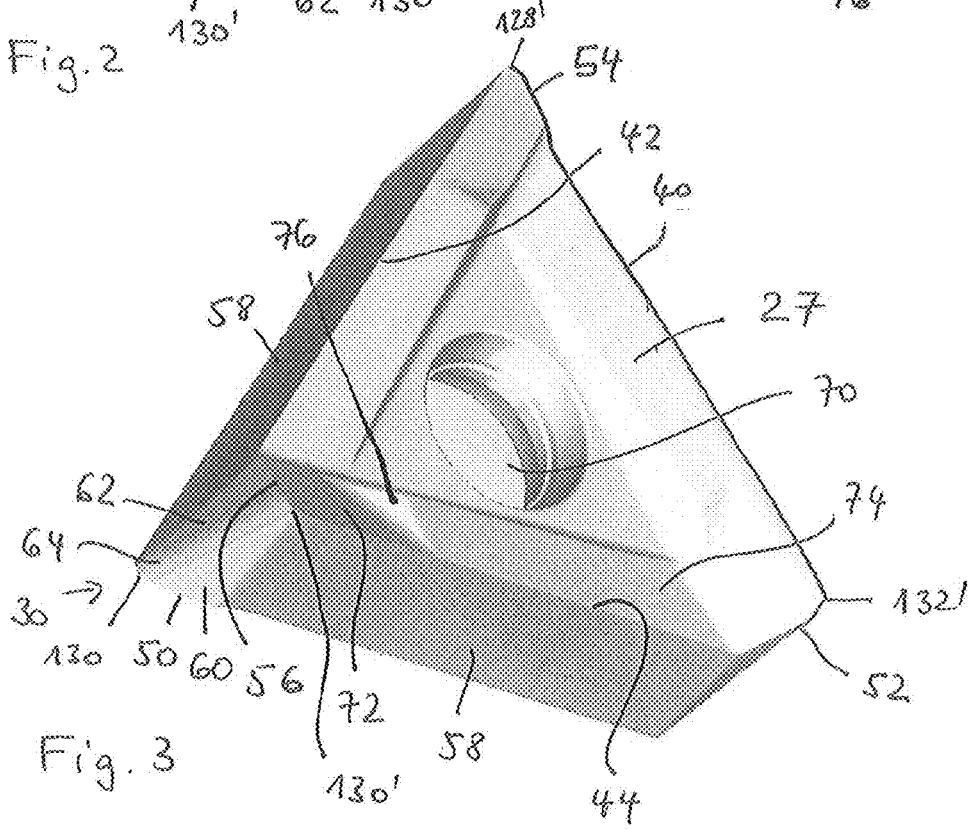
FIG. 3 shows a perspective bottom view onto the indexable insert according to FIG. 1.

FIGS. 2 and 3 show a top view onto the top surface 26 or onto the bottom surface 27 of the indexable insert 16. It can be seen that the geometry of the top surface and of the bottom surface 26 and 27 is identical, it also being possible for this to be an option only for the edges with the cutting edges and rake faces and flanks also explained below.

However, regardless which of the two insert surfaces 26, 27 lies in the rotational direction of the milling cutter 10 and which of the cutting edges are actually in use, it is important that always the same rake face and clearance angle are present on the respective cutting edges along with the identical location and position of the main and secondary cutting edges. The achievement here is that the indexable insert can be rotated and turned and fastened to the tool in an arbitrary manner and, in spite of this, the same cutting edge geometry is always in use.

The indexable insert 16 comprises three virtual corners 28 to 32 (see FIG. 2). Main cutting edges 34 to 38 are present on the top surface and on the bottom surface 26 or 27 along the longitudinal edges. The main cutting edges are, so to speak, the intersection lines or edges on the longitudinal sides of the triangle between the top surface 26 and the circumferential surface. The circumferential surface forms flanks, as will be explained again below. Three further main cutting edges 40 to 44 are realized between the bottom surface 27 and the circumferential surface.

Each main cutting edge 34 to 44 has a shorter secondary cutting edge 46 to 56, only associated with that main cutting edge. The secondary cutting edges 46 to 56, figuratively speaking, are formed by trimming the corners 28 to 32 in each case proceeding from the top surface and the bottom surface 26 or 27. In other words, the corners 28 to 32 receive a chamfer which forms the secondary cutting edge and its flank. Each main cutting edge 34 to 44 is at approximately 90° with respect to its associated secondary cutting edge 46 to 56. This can also be seen in FIG. 1.

Each secondary cutting edge 46 to 56 adjoins two main cutting edges 34 to 44. Each secondary cutting edge preferably adjoins, even in a direct manner, the two adjacent main cutting edges 34 to 44. The secondary cutting edge, however, is at different angles $\delta_1$ and $\delta_2$ with respect to the two main cutting edges (see FIG. 4a). In each case, there is only one main cutting edge 34 to 44 which is used together with the secondary cutting edge 46 to 56; this is then the associated main cutting edge. In the case of the embodiment represented, the main and the secondary cutting edges which are associated with each other are always aligned at approximately 90° with respect to each other. The angle between the secondary cutting edge and the adjoining, non-associated main cutting edge is then approximately 120° (angle $\delta_2$).

The secondary cutting edges 46 to 56 are also designated as surface cutting edges.

The main cutting edges 34 to 44 extend in a linear manner proceeding from the cutting edge corner 128, 130, 132, 128', 130' and 132', which is formed with its associated secondary cutting edge, as far as up to the end of the adjoining secondary cutting edge which is no longer associated therewith. This means, for example, for the main cutting edge 34 according to FIG. 2, that it extends proceeding from the cutting edge corner 132, which is formed with the secondary cutting edge 46, in a linear manner as far as up to the adjoining secondary cutting edge 48 and consequently forms the entire longitudinal edge. The same also applies to all the other main cutting edges 36 to 44.

The secondary cutting edges 46 to 56 also extend in a linear manner. As an alternative, they could also extend in a slightly convex manner.

Each main cutting edge 34 to 44 has a flank 58 associated therewith as part of the circumferential surface, the respective flank 58 extending as a continuous planar face along the entire main cutting edge 34 to 44 associated therewith.

The secondary cutting edges 46 to 56 have in each case precisely one specific flank which is only associated therewith, as is explained below by way of the corner 30. FIGS. 2 and 3 show that the secondary cutting edge 50 has a flank 60, which proceeds therefrom, is only associated therewith and tapers toward the bottom surface 27, in particular in the manner of a triangle.

Each flank 60 is preferably a planar face, it also being possible for it to be slightly convex. The flank 60 ends at the cutting edge corner 130', which is formed by the main cutting edge 44 and the secondary cutting edge 56 associated therewith (see FIG. 3).

The secondary cutting edge 56, which is provided at the corner 30 on the opposite surface, i.e. on the bottom surface 27, also has a flank which has the reference 62 and is also shaped as a triangle and extends correspondingly in a planar manner with respect to the top surface 26 in order to run out at the cutting edge corner 130, which is formed by the main cutting edge 38 and its secondary cutting edge 50. The two flanks 60, 62 are angled toward each other; the angle between said two faces is 90° in an arbitrary radial sectional plane R, the radial sectional plane R extending perpendicular to the center axis Y. The center axis Y is the center of gravity axis and the imagined rotational axis of the indexable insert 16.

As can be seen in FIGS. 2 and 3, but also in particular in FIG. 4b, the flank 60 extends, when seen in a top view onto its associated insert surface, from its secondary cutting edge 50 slightly inclinedly sideways outward in the direction toward the opposite insert surface (in this case the bottom surface). The same applies to the flank 62 when viewed in a top view, in this case, onto the bottom surface. FIG. 4b shows that the flanks 60, 62 extend inclinedly outward at an angle of between 2 and 20° with respect to the center axis Y.

The flanks 60, 62 do not merge into each other in a sharp edge, but rather by means of a rounded connecting edge 64. The connecting edge 64 extends in a spatially inclined manner from the cutting edge corner 130', which is formed by the main cutting edge 44 and its secondary cutting edge 56, to the opposite cutting edge corner 130, which is formed by the main cutting edge 38 and its associated secondary cutting edge 50 (see FIGS. 2 and 3).

This same development for the flanks of the associated secondary cutting edges is present for each of the corners 28 to 30. Maneuverability of the cutting tip 16 is achieved by means of these specific flanks which are angled with respect to each other.

As can be seen in FIG. 6, the rake faces 58 of the main cutting edges 34 to 44 extend parallel to the imagined center axis Y of the central reception opening 70 for the screw 20.

In all the side views (see FIGS. 5 and 6) the main cutting edges extend in each case in pairs parallel (see in particular also FIG. 6) and inclinedly to the axis Y. The angle γ, in this case, is preferably between 3 and 20° with respect to the radial sectional plane R (see FIG. 6). The angle γ is measured when viewed at right angles to the associated flank so that in FIG. 6 it is represented in a slightly distorted manner.

The rake face of the main cutting edges 44 is subdivided into differently inclined regions 72 and 74. This is explained in more detail by way of FIG. 3. The region 72 is the region which also lies close to the associated secondary cutting edge 56 such that the region 72 represents the rake face for both cutting edges 44, 56. The region 72 of the rake face is inclined more strongly than the region 74 positioned at the opposite end of the main cutting edge 44. The region 74 extends as far as up to adjoining the adjacent secondary cutting edge 52.

Both regions 72, 74 can be realized in a planar manner to simplify production.

The two differently inclined regions 72, 74 merge into each other in a substantially triangular step 76. This design of the rake faces is identical for each of the total of six cutting edges, consisting of main and secondary cutting edge.

The indexable inserts shown are preferably produced by means of sintering, the geometry being well suited to the sintering operation in spite of the numerous cutting edges.

The indexable insert 16 is positioned in an angled manner in its associated receiving means 18 in the tool shank 14 such that there is a clearance angle of >0°.

The clearance angle for the main cutting edges is between 3 and 20°, that for the secondary cutting edges is between 3 and 15°.

What is claimed is:

1. A double-sided indexable insert having a triangular shape with three corners, a top surface, a bottom surface and a circumferential surface forming flanks that connects the top surface and the bottom surface, wherein three main cutting edges and three secondary cutting edges are formed at an intersection between the circumferential surface and the top surface, and three main cutting edges and three secondary cutting edges are formed at an intersection between the circumferential surface and the bottom surface for a total of six main cutting edges and six secondary cutting edges, each main cutting edge adjoining an associated secondary cutting edge and a non-associated secondary cutting edge, and a triangular-shaped flank extending from each secondary cutting edge formed at the intersection between the top surface and the circumferential surface toward the bottom surface, and a triangular-shaped flank extending from each secondary cutting edge formed at the intersection between the bottom surface and the circumferential surface toward the top surface, and wherein the triangular-shaped flanks adjacent each other are angled toward each other, wherein the secondary cutting edges are at different angles with respect to the two adjoining main cutting edges.

2. The indexable insert as claimed in claim 1, wherein said indexable insert is a corner milling cutting insert.

3. The indexable insert as claimed in claim 1, wherein said indexable insert is a 90° surface corner milling cutting insert.

4. The indexable insert as claimed in claim 2, wherein the the secondary cutting edges are formed by trimming the corners from the top surface to the bottom surface.

5. The indexable insert as claimed in claim 1, wherein each main cutting edge and the adjoining, associated secondary cutting edge are formed at an angle of approximately 90° with respect to each other, and wherein each secondary cutting edge and the adjoining, non-associated main cutting edge is formed at an angle of approximately 120° with respect to each other.

6. The indexable insert as claimed in claim 1, wherein each main cutting edge extends in a linear manner from one secondary cutting edge to another secondary cutting edge.

7. The indexable insert as claimed in claim 1 further comprising a connecting edge extending between the adjacent triangular-shaped flanks.

8. The indexable insert as claimed in claim 7, wherein the connecting edge is rounded.

9. The indexable insert as claimed in claim 1, wherein the flanks of the secondary cutting edges extend inclinedly sideways and outward toward the opposite insert surface at an angle of between 2 and 20° with respect to a center axis (Y) of the indexable insert.

10. A double-sided indexable insert having a triangular shape with three corners, a top surface, a bottom surface and a circumferential surface forming flanks that connects the top surface and the bottom surface, wherein three main cutting edges and three secondary cutting edges are formed at an intersection between the circumferential surface and the top surface, and three main cutting edges and three secondary cutting edges are formed at an intersection between the circumferential surface, and the bottom surface for a total of six main cutting edges and six secondary cutting edges, each main cutting edge adjoining an associated secondary cutting edge and a non-associated secondary cutting edge, and a triangular-shaped flank extending from each secondary cutting edge formed at the intersection between the top surface and the circumferential surface toward the bottom surface, and a triangular-shaped flank extending from each secondary cutting edge formed at the intersection between the bottom surface and the circumferential surface toward the top surface, and wherein the triangular-shaped flanks adjacent each other are angled toward each other, wherein main cutting edges has its own rake face and each rake face has differently inclined regions.

11. The indexable insert as claimed in claim 10, wherein the rake face of each main cutting edge is more inclined in the region of its associated secondary cutting edge than in the region remote from the associated secondary cutting edge.

12. The indexable insert as claimed in claim 10, wherein the differently inclined regions of the rake face merge into each other via an inclined step.

13. The indexable insert as claimed in claim 1, wherein the flank of each main cutting edge is planar.

14. A surface corner milling cutter having a tool shank and fastened thereon at least one indexable insert as claimed in claim 1, wherein the indexable insert is fastened to the tool shank such that the flank of the secondary cutting edge in use has a positive clearance angle.

\* \* \* \* \*

UNITED STATES PATENT AND TRADEMARK OFFICE
CERTIFICATE OF CORRECTION

| | | |
|---|---|---|
| PATENT NO. | : 8,905,686 B2 | Page 1 of 1 |
| APPLICATION NO. | : 13/523962 | |
| DATED | : December 9, 2014 | |
| INVENTOR(S) | : Hausmann et al. | |

It is certified that error appears in the above-identified patent and that said Letters Patent is hereby corrected as shown below:

On the Title Page, in Item (57), under "ABSTRACT", in Column 2, Line 3, delete "said the" and insert -- the --, therefor.

In the Claims

In Column 7, Line 27, in Claim 7, delete "claim 1" and insert -- claim 1, --, therefor.

In Column 8, Lines 7-8, in Claim 10, delete "circumferential surface," and insert -- circumferential surface --, therefor.

In Column 8, Line 19, in Claim 10, delete "wherein main" and insert -- wherein each main --, therefor.

Signed and Sealed this
Twenty-eighth Day of April, 2015

Michelle K. Lee
*Director of the United States Patent and Trademark Office*